(12) United States Patent
Robbins et al.

(10) Patent No.: US 9,060,345 B2
(45) Date of Patent: *Jun. 16, 2015

(54) NOTIFICATIONS BASED ON DEVICE PRESENCE

(71) Applicant: AT&T INTELLECTUAL PROPERTY I, L.P., Atlanta, GA (US)

(72) Inventors: William Robbins, Sun Prairie, WI (US); Judson Flynn, Decatur, GA (US); Randolph Wohlert, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/867,823

(22) Filed: Apr. 22, 2013

(65) Prior Publication Data

US 2013/0244650 A1 Sep. 19, 2013

Related U.S. Application Data

(63) Continuation of application No. 12/893,703, filed on Sep. 29, 2010, now Pat. No. 8,428,616.

(51) Int. Cl.
*H04W 24/00* (2009.01)
*H04W 60/00* (2009.01)
*H04W 4/02* (2009.01)
*H04W 84/04* (2009.01)

(52) U.S. Cl.
CPC .............. *H04W 60/00* (2013.01); *H04W 4/021* (2013.01); *H04W 84/045* (2013.01)

(58) Field of Classification Search
CPC ..... H04W 4/021; H04W 4/022; H04W 4/025; H04W 4/04; H04W 4/028; H04W 64/003; H04W 64/006
USPC ......... 455/456.1, 456.2, 456.3, 456.4, 456.5, 455/456.6, 404–1, 404.2, 414.1, 432.3, 455/435.1; 709/222, 223, 224, 203, 219
See application file for complete search history.

(56) References Cited

U.S. PATENT DOCUMENTS

| | | | |
|---|---|---|---|
| 6,993,327 B2 | 1/2006 | Mathis et al. | |
| 7,676,577 B2 | 3/2010 | Ozugur et al. | |
| 7,840,636 B2 | 11/2010 | Knauerhase et al. | |
| 7,844,055 B2 | 11/2010 | Mukherjee et al. | |
| 7,933,563 B2 | 4/2011 | Satou | |
| 8,234,366 B2 | 7/2012 | Suryanarayana et al. | |
| 2005/0266859 A1* | 12/2005 | Tejani et al. | 455/456.4 |
| 2006/0167978 A1 | 7/2006 | Ozugur et al. | |
| 2008/0102802 A1 | 5/2008 | Do et al. | |

(Continued)

OTHER PUBLICATIONS

Office Action dated Aug. 30, 2012 for U.S. Appl. No. 12/893,703, 18 pages.

*Primary Examiner* — Jean Gelin
(74) *Attorney, Agent, or Firm* — Amin, Turocy & Watson, LLP

(57) ABSTRACT

An architecture is provided that can facilitate and/or transmit notifications based upon device presence techniques in connection with a wireless communications network. For example, when certain mobile devices register with a particular network entity (e.g., a femtocell) that services a particular target location (e.g., place of residence), then such registration can be leveraged to indicate presence at the target location. Accordingly, notifications can be delivered to custodian devices that indicate the presence information if certain predetermined conditions or criteria are satisfied.

20 Claims, 12 Drawing Sheets

(56) References Cited

U.S. PATENT DOCUMENTS

| | | |
|---|---|---|
| 2008/0140650 A1 | 6/2008 | Stackpole et al. |
| 2009/0098886 A1 | 4/2009 | Kiss et al. |
| 2009/0156162 A1 | 6/2009 | Satou et al. |
| 2009/0253441 A1 | 10/2009 | Wallis et al. |
| 2009/0254627 A1* | 10/2009 | Morris .......................... 709/206 |
| 2012/0243477 A1* | 9/2012 | Shinada et al. ............... 370/328 |

* cited by examiner

NOTIFICATIONS BASED ON DEVICE PRESENCE

CROSS-REFERENCE TO RELATED APPLICATIONS

This application is a continuation of U.S. patent application Ser. No. 12/893,703, filed on Sep. 29, 2010, entitled "NOTIFICATIONS BASED ON DEVICE PRESENCE." The entirety of the foregoing application is incorporated herein by reference.

TECHNICAL FIELD

The present application relates generally to wireless communications networks, and more specifically to utilizing device registration with a network entity such as a femtocell as an indication of presence.

BACKGROUND

Today, millions of children world-wide are described as "latchkey" kids, a term deriving from the observation that when these children arrive at home, either from school or other endeavors, they will often do so to an empty house, and therefore, must carry a latchkey with them. In most cases, parents of these children will be interested and relieved to know their children arrived home safely. Unfortunately, due to other obligations, such as work, those parents who cannot be at home to greet their children also often are not even able to learn when their children do arrive home, which can lead to a great deal of anxiety.

As a result, parents and other caregivers are turning to advancing technologies to alleviate this dilemma. For example, global positioning satellite (GPS) employs an array of satellites and other space-based components for navigation and other location-based services relying upon concepts of trilateration to determine location. Accordingly, various services are currently available to track the location of suitable devices (and, by proxy, the associated user) at a particular time or over time, which parents, caregivers, or other interested parties can employ to, e.g., be apprised of the whereabouts of children.

Unfortunately, GPS-based systems also introduce a variety of undesirable issues. First, special-purpose equipment must be employed, which incurs an added expense, both due to the equipment itself and the (often recurring) GPS service charges, which can be quite substantial over time. Second, children or other suitable parties must be encouraged to neither forget nor refuse to carry the GPS-based tracking device. By integrating GPS equipment into cell phones or other wireless devices that children are often quite willing to keep with them at all times, the second issue can be largely mitigated, yet the first one remains: added expense. Moreover, this issue is often greater than need be, as children or other parties who require suitable types of care, tend to be more likely to lose, damage, or have stolen their mobile devices.

In addition, there are some market participants who believe GPS-based tracking is far too invasive and contrary to many legitimate privacy concerns of the parents, since such data can be potentially utilized in ways not authorized by the parents and in a manner that can be predictably damaging to both parents and children alike. Accordingly, what is needed is a way to give parents or other authorized parties peace of mind, without relying upon GPS-based systems that can be prohibitively expensive and/or undesirable in terms of privacy concerns.

DETAILED DESCRIPTION

Figure 1:
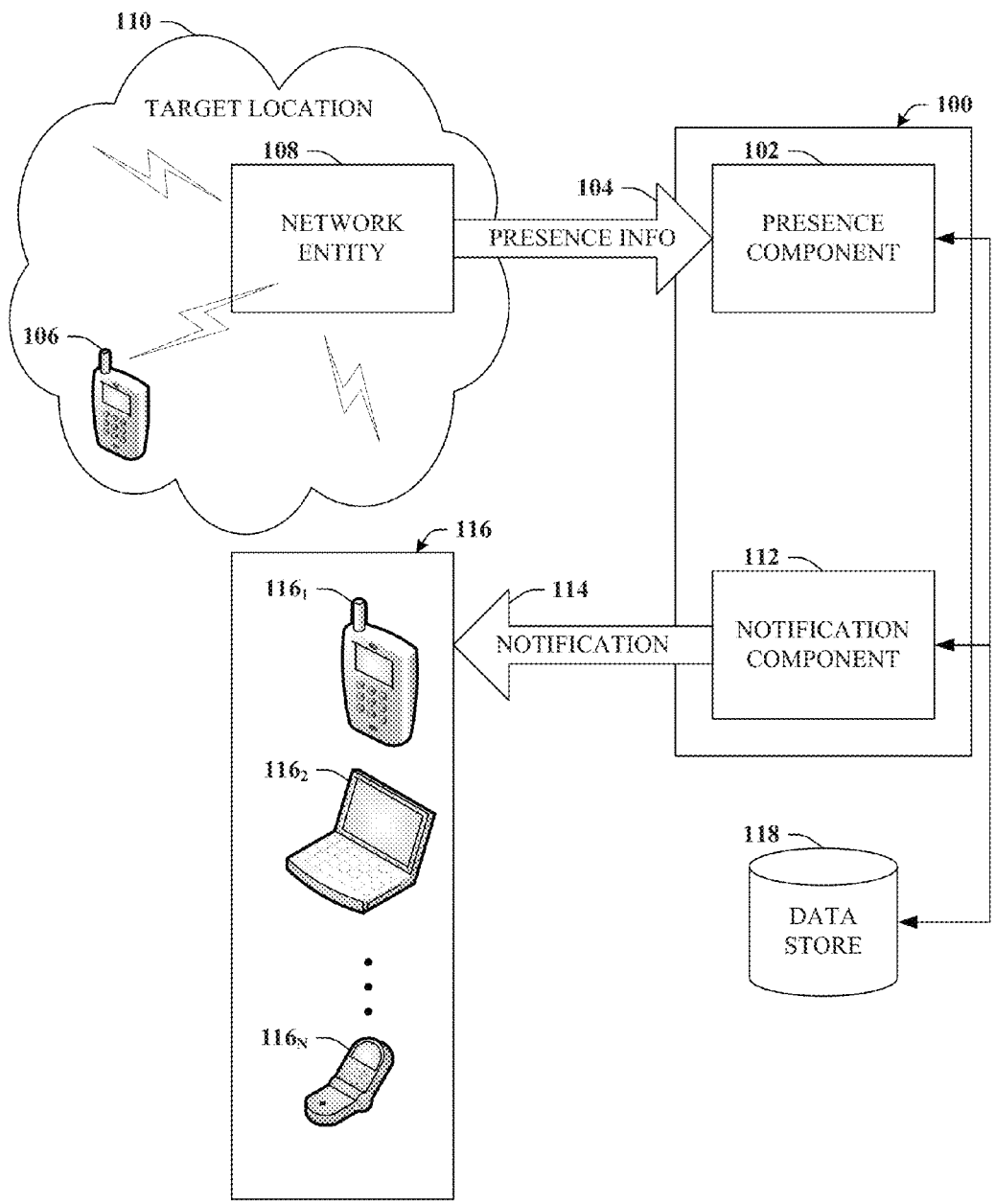
FIG. 1 is a block diagram of a system that can facilitate notifications based upon device presence techniques in connection with a wireless communications network.

The subject matter disclosed herein, in one aspect thereof, comprises a wireless communications network architecture that can construct and/or facilitate transmission of notifications based upon device presence techniques. In accordance therewith and to other related ends, the architecture can include a presence component that can be configured to receive and store presence information characterized by network registration of a subservient mobile device to a network entity (e.g., a femtocell) that services a target location such as a home.

Moreover, the architecture can also receive and log presence information relating to a lack of presence (e.g., absence) either through registration to a disparate network entity (e.g., network entity other than the femtocell at home) or in some cases de-registration from the network entity.

Regardless, of the type of presence information in question, the architecture can also include a notification component that can facilitate transmission, either directly or via a disparate entity such as a short message service (SMS) server of a notification relating to the presence information. Further, the notification component can be configured to facilitate transmission of the notification to at least one custodian device if the presence information satisfies a set of predetermined conditions, such as, for example, send the notification once the presence of a particular device is detected at home or if that device leaves home before a certain time and so forth.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Further, terms like "user equipment," "mobile device," "mobile," "subscriber station," "access terminal," "terminal," "handset," and similar terminology, generally refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "cell site," "Node B," "evolved Node B" and other outdoor environment devices, can be utilized interchangeably in the subject application. Similarly, terms such as "femtocell", "femto," "home Node B", "micro cell" and other indoor environment devices can be used interchangeably as well. In either outdoor or indoor cases, such devices can refer to a wireless network component or appliance that serves and receives data, control, voice, video, sound, gaming, or substantially any data-stream or signaling-stream from a set of subscriber mobile devices. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network," "communications network," "network" and the like are used interchangeable in the subject application, when context for any of these term utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawing, with reference initially to FIG. 1, system 100 that can facilitate notifications based upon device presence techniques in connection with a wireless communications network is depicted. For example, by relying upon device presence techniques rather than trilateration techniques as is employed with global positioning satellite (GPS) and many other location-based services, little or no special purpose equipment or computation need be necessary. Hence, the subject matter disclosed herein can be at once less expensive for end-users and less invasive in terms of certain privacy concerns.

Generally, system 100 can include presence component 102 that can be configured to receive and store presence information 104. Presence information 104 can be characterized by network registration of subservient mobile device 106 to network entity 108 that services target location 110. Put another way, when subservient mobile device 106 enters (or leaves) an area of service (e.g., target location 110) covered by network entity 108, then network entity 108 can "sense" such and provide appropriate information (e.g., presence information 104) to presence component 102 as a result. In this case, "sensing" the presence of subservient mobile device 106 can be established when subservient mobile device 106 registers with network entity 108 in order to utilize network entity 108 as a communications portal to a core network of the wireless communications network. As a result, in one or more aspect, presence information 104 does not include GPS data, but rather relies on device presence data.

Figure 2:
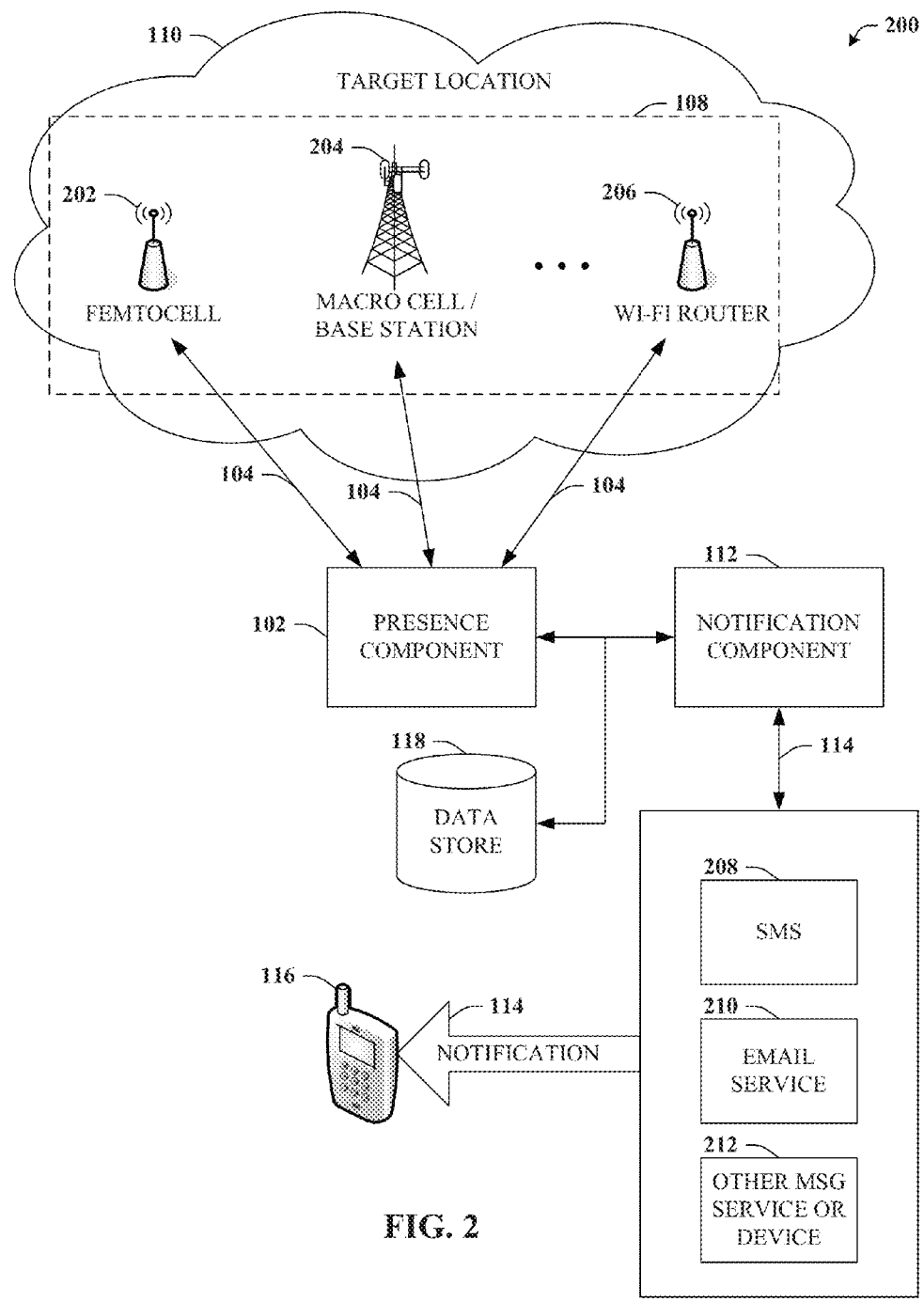
FIG. 2 provides a block diagram of a system illustrating additional features or aspects of notifications based upon device presence.

Thus, network entity 108 is intended to be a suitable wireless communications network component, typically a terrestrial-based component, that can provide wireless communications network services in a substantially fixed geographic area (e.g., target location 110), and that allows or requires devices to register in order to utilize the services provided while in the area of service. Such can be exemplified by FIG. 2, which can be now referenced in conjunction with FIG. 1. FIG. 2 depicts system 200 illustrating additional features or aspects of notifications based upon device presence techniques. For example, in one or more aspect, network entity 108 can be femtocell 202 sometimes referred to as a micro cell or home Node B (HNB). Additionally or alternatively, network entity 108 can be wireless fidelity (WI-FI) router 206; or a macro cell or base station 204 included therein. Hence, while it should be understood network entity need not be limited to any one type of suitable network component, in the reminder of this document it is generally assumed that network entity 108 is a femtocell unless specified otherwise.

In general, femtocells (e.g., femtocell 202) are designed for indoor environments such as a home or office. Femtocells utilize a broadband router to carry packet-based voice and/or data to the core network of the wireless communications network via a broadband connection to the Internet such as digital subscriber line (DSL) or a cable modem. Thus, femtocells can provide a strong signal and robust services in environments that traditionally offer only poor coverage, such as that commonly experienced behind the walls of a building. Additional detail, aspects or example embodiments relating to femtocells, network entity 108, and/or other components that can be included in the wireless communications network are provided in connection with FIGS. 9-11. Moreover, it should be appreciated that, given femtocells are designed for in-home coverage, a device typically must be at home in order to register with a femtocell, and thus employ the services thereby provided.

As such, the disclosed subject matter can leverage these and other related features to obtain presence information 104, which can in turn be leveraged to provide valuable notifications relating to presence information 104. For example, when subservient device 106 registers with femtocell 202 (e.g., network entity 108) servicing the residential home, then it can be presumed the operator of subservient device 106 is at home, hence establishing a degree of presence. As previously noted such information can be received and stored by presence component 102. As one example, presence component 102 can store presence information 104 to data store 118. As used herein, data store 118 is intended to be a repository of all or portions of data, data sets, or information described herein or otherwise suitable for use with the described subject matter. Data store 118 can be centralized, either remotely or locally cached, or distributed, potentially across multiple devices and/or schemas. Furthermore, data store 118 can be embodied as substantially any type of memory, including but not limited to volatile or non-volatile, sequential access, structured access, or random access, solid state, and so on. It should be understood that all or portions of data store 118 can be included in systems 100, or can reside in part or entirely remotely from systems 100.

In accordance therewith, system 100 can also include notification component 112 that can be an application included in a computer-readable storage medium or in execution by a processor. Notification component 112 can facilitate transmission of notification 114 to at least one custodian device $116_1$-$116_N$, where N can be any substantially positive integer, when or if presence information 104 satisfies a set of predetermined conditions. It should be understood that the at least one custodian device $116_1$-$116_N$ can be referred to herein, either collectively or individually as custodian device(s) 116, with appropriate subscripts employed generally only when necessary or convenient to highlight various distinctions or to better impart the disclosed concepts.

As one concrete example, consider the case in which both parents (e.g., "mom" and "dad") work late into the evening on most days, while their two children (e.g., "Ashley" and "Billy") typically arrive home (e.g., target location 110) from school by late afternoon. Further assuming the parents subscribe to femtocell service (or some other suitable service), when either Ashley or Billy arrive home, their individual handsets (e.g., subservient mobile devices 106) will cease their open air interface to a local Node B/base station (e.g., base station 204) of a particular macro cell, and instead register with their household femtocell 202 (e.g., network entity 108). When such occurs, presence information 104 can be delivered to presence component 102. As a result, notification component 112 can facilitate transmission of notification 114 to a device (e.g., custodian device 116) of mom and/or dad. For instance, notification 114 can indicate, e.g., "Ashley (or Billy, or both) arrived home today at 3:51 pm."

It should be appreciated that since mom and/or dad typically only receive notification 114 in the event that a certain set of predetermined conditions or criteria are satisfied, this is a very simple case. For example, the set of conditions in this case can be, e.g., "send both mom and dad the notification when Ashley and Billy arrive home from school" (e.g., notification 114 upon first arrival at home any time after 3:30 pm, the normal time in which school lets out, during weekdays). Additional detail in connection with the set of predetermined conditions and/or configuration thereof is provided with reference to FIGS. 3 and 4.

While still referring to FIGS. 1 and 2, it should be understood that notification 114 can be delivered to custodian device 116 in a variety of ways. As one example, notification 114 can be formatted and delivered according to short message service (SMS) 208. As another example, notification can be delivered according to an email protocol, e.g., by way of email service 210. Of course, other methods of delivering notification 114 to custodian device 116 can exist, which can be provided either directly via notification component 112 (e.g., FIG. 1) or via another message service or device 212 (e.g., FIG. 2) upon receiving suitable instructions from notification component 112.

Thus, it should be readily apparent that while custodian device 116 (and subservient device 106) can be a mobile device such as a cellular phone, smart phone, personal digital assistant, laptop, netbook, or the like, custodian device 116 need not be a mobile device, but rather can also be an ordinary desktop computer, or substantially any device that can access a particular messaging service and/or email account.

It should be further appreciated that there need not be any physical distinction between subservient mobile device 106 and any suitable conventional mobile device or that of mobile devices that act as custodian devices 116. Rather, subservient mobile devices 106 can be substantially identical in terms of hardware etc. (and need not, but can, utilize GPS components, yet any such use would not be necessary to alert custodian device 116 of presence information 104). Thus, the term "subservient" does not necessarily reflect any lesser state of subservient device 106, but is employed as an identifier indicating devices whose presence are intended to monitored. For instance, femtocell service subscribers typically must set up a list of authorized users (e.g., the devices that are authorized to employ the wireless communications network via femtocell 202). In the process of creating the list of authorized users, the femtocell service subscriber can choose which phones are to be "subservient" (e.g., subject to presence info collection such as Ashley and Billy) and, optionally, which are to be "custodian" (e.g., likely to be recipients of various notifications 114 relating to presence of subservient devices 106). Appreciably, custodian devices 116 need not necessarily be on the authorized user list, but subservient mobile devices 106 typically will in order to allow for registration with femtocell 202 as subservient mobile devices 106 arrive at target location 110 (e.g., home).

Regardless, notification component 112 can be configured to facilitate transmission of notification 114 in real time as the set of predetermined conditions is determined to be satisfied. In one or more aspects, notification 114 can be configured to provide an indication that a user of subservient mobile device 106 has arrived at target location 110 based upon network registration of subservient mobile device 106 to femtocell 202 servicing target location 110. For example, such aspects were detailed supra in connection with the example scenario in which mom and/or dad are notified upon arrival at home by Ashley or Billy.

However, it should be appreciated that in one or more aspect, notification 114 can also be configured to provide an indication that a user of subservient mobile device 106 has departed from target location 110. Such can be accomplished in a variety of ways. For example, notification component 112 can facilitate the associated notification 112 based upon network registration of subservient mobile device 106 to a different network entity 108 (e.g., different than femtocell 202 that was registered when Ashley arrived home from school, indicating Ashley's presence is no longer at home and/or not within the coverage area of femtocell 202), such as base station 204, WI-FI router 206, or a disparate femtocell 202 (e.g., a friend's or neighbor's femtocell 202). As a second example, notification component 112 can facilitate the associated notification 112 based upon network de-registration of subservient mobile device 106 from femtocell 202 servicing target location 110.

Typically, in the case of predetermined conditions relating to absence or lack of presence (e.g., leaving as opposed to arriving at target location 110), registration with a disparate network entity 108 is generally preferred over de-registration, since powering down subservient mobile device 106 can in some cases result in such a de-registration, even though subservient mobile device 106 did not depart from target location 110, merely from the wireless communications network and/or the network entity 108 servicing target location 110. By way of further illustration, resuming the common scenarios used herein, while mom can still receive notification 114 when Ashley arrives at home (e.g., a first set of predetermined conditions), a second set of predetermined conditions can, when satisfied, result in a second notification 114 being delivered to mom, such as when Ashley leaves the house after getting home from school.

Figure 3:
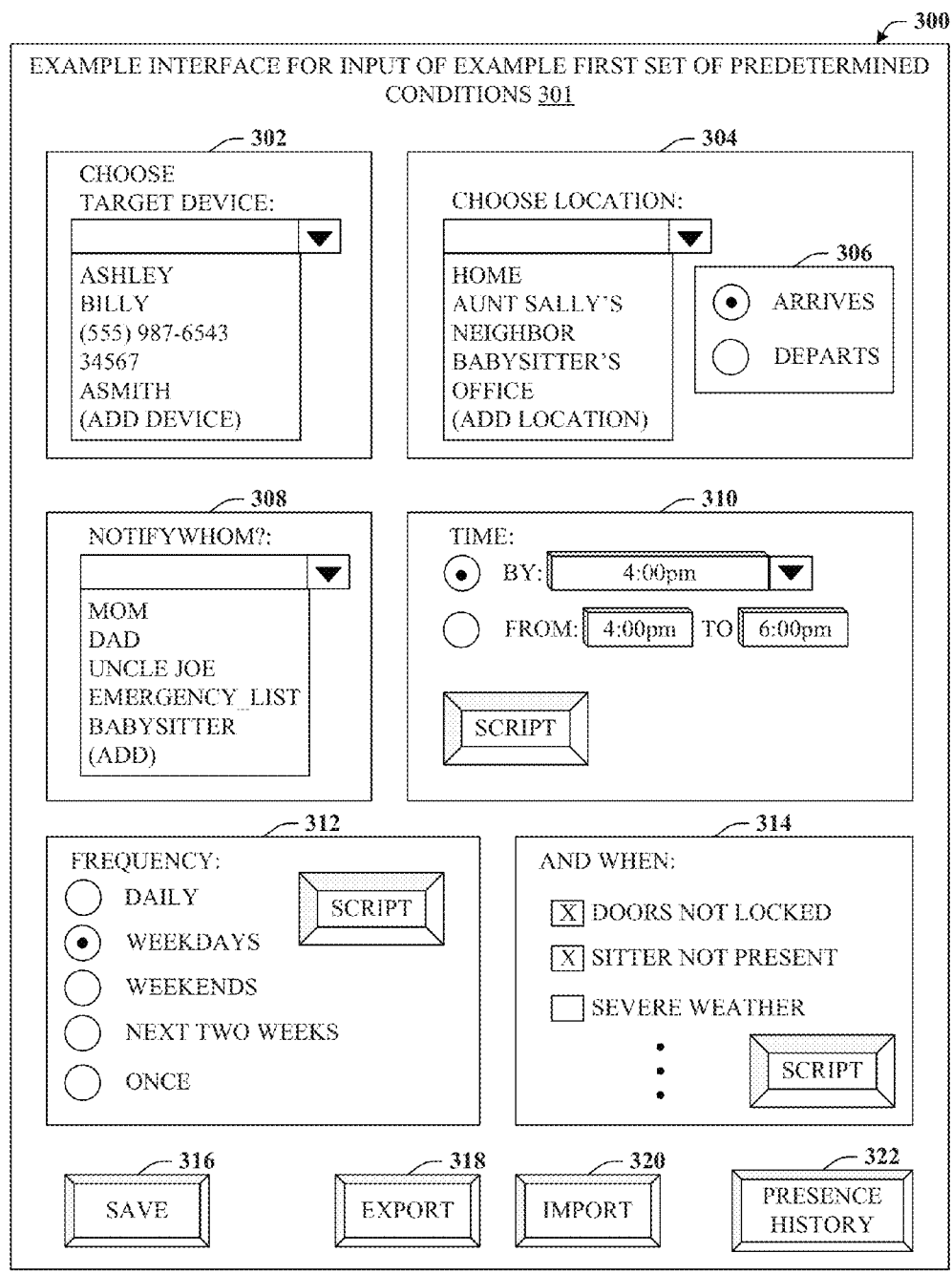
FIG. 3 illustrates a graphic depiction of an interface for input and/or configuration of the set of predetermined conditions or other related parameters.

With reference now to FIG. 3, interface 300 for input and/or configuration of the set of predetermined conditions is provided. It should be appreciated that both interface 300 as well as any particular set of predetermined conditions/criteria 301 discussed herein is intended to be for illustrative purposes, and therefore is not necessarily intended to be limiting. For example, interface 300 can include multiple sub-interfaces, as well as any combination of interface objects such as input boxes, drop-down menus, radio buttons, check-boxes, dialog boxes, menu bars, widgets, confabulators, and so forth. Appreciably, the above can differ based upon differing applications and/or form factors utilized to provide and/or access interface 300.

Typically, access to interface 300 will be limited to authorized members of a particular service provision, such as a service provision relating to the wireless communications network, or particularly to a femtocell service provision thereof. Thus, drawing again from the example scenarios introduced above, mom or dad (who ostensibly pay for and have agreed to the associated service contract) can be authorized parties to access and/or configure suitable sets of predetermined conditions 301 or other relevant data, whereas Ashley and Billy, will likely not be authorized to access interface 300 and/or configure various sets of predetermined conditions 301. Rather, Ashley and Billy (or more precisely associated wireless devices thereof) will likely be set as subservient mobile devices 106, as further detailed infra.

In one or more aspect, some of which have been previously introduced, set of predetermined conditions 301 can relate to at least one of arrival or absence of subservient mobile device 106 at target location 110; arrival or absence of subservient mobile device 106 at the target location 110 (1) by a certain time, (2) within a certain period of time, or (3) in connection with a state of target location 110; departure or lack of departure of subservient mobile device 106 from the target location 110; or departure or lack of departure of subservient mobile device 106 from target location 110 (4) by a certain time, (5) within a certain period of time, or (6) in connection with a state of target location 110.

In addition, in one or more aspects, set of predetermined conditions 301 can be configurable based upon input from at least one of a user or an authorized user of the at least one mobile device, a user or an authorized user of the subservient mobile device, a subscriber to femtocell service at the target location, or an agent of the wireless communications network.

By way of example, interface 300 can enable an authorized user (e.g., mom or dad) to select a target device (e.g., subservient mobile device 106), as illustrated at reference numeral 302. In this exemplary case, such can be accomplished by way of a drop-down menu. The drop-down menu can be initially populated with all or a portion of the authorized users of femtocell 202, yet in any event an option can be provided to "add device(s)", wherein suitable identifying information can be input, as well as an option (not shown) to delete previously saved selections. Any data entered here (as well as other portions described herein) can be stored for later access or recall and can be employed to automatically populate an authorized user list (e.g., of femtocell 202). Moreover, subservient mobile device 106 can be selected by actual name of the device operator (e.g., Ashley, Billy, . . . ), or based upon some other identifying criteria depending upon the implementation, such as, e.g., a phone number, reference ID, username or the like. Although not expressly depicted, similar features can be provided with other portions of the interface as well.

Furthermore, interface 300 can include a sub-interface or other means (e.g., reference numeral 304) for selecting a location (e.g., target location 110) in which presence data is to be monitored. Here another drop-down menu is illustrated, listing by way of example, "home" (e.g., femtocell 202 associated with the residence of mom and dad), "aunt sally's" (e.g., femtocell 202 associated with the residence of Sally, Ashley and Billy's aunt), the same for a friendly neighbor, babysitter, and dad's office, which also utilizes a femtocell or other suitable network entity 108, and a selection that can be employed to add a new location (or delete an existing location). It should be appreciated that as a general rule, in order to select target locations 110 relating to aunt sally's or the neighbor or babysitter, subservient mobile device 106 will need to be on an authorized user list associated with the network entity 108 utilized at that location (e.g., Ashley must be allowed to connect to the network with her device via resident network equipment, e.g., femtocell 202).

Also depicted are a couple of radio buttons labeled with reference numeral 306 in which the type of presence information can be selected. For instance, radio buttons 306 can be utilized to select whether notification 114 should be sent upon arrival at the chosen location 304 or departure from the chosen location 304.

Next to be described, at reference numeral 308, interface 300 can provide for selection of whom to notify in the event set of predetermined 301 are satisfied. In other words, in the event set of predetermined 301 are satisfied, box 308 can be employed to select the recipient(s) for notification 114. Appreciably, one or more individual recipients can be selected, as well as lists, such as "emergency list", which can include multiple parties that can be preconfigured. In addition, interface 300 can provide a means for setting up, saving, updating, naming, or deleting of any such lists. Given that notification 114 can take a variety of forms (e.g., SMS, email, . . . ), box 308 can also include an interface (not shown) directed to the type of notification desired, which could affect the custodian device 116 that will be selected to receive notification 114 based upon the particular circumstances and/or configuration.

Interface 300 can also provide an option for time-based criteria 310 of conditions 301. For example, in contrast to the initial scenario in which mom receives a notification when Ashley arrives home after school, mom could alternatively (or in addition to, e.g., with a second set of conditions 301) configure conditions 301 to generate the notification if Ashley does not arrive home by 4:00 pm on weekdays, given Ashley's school lets out at 3:30, or to receive a notification should Ashley leave home before mom gets home from work, which is typically about 6:00 pm. Thus, for instance time 310 can be selected (in connection with leaving home) to be between 4:00 pm and 6:00 pm. In addition, box 310 (as well as other sections of interface 300) can also include a "Script" button in which scripts for more complex conditions 301, or conditions otherwise not available by default or ready selection.

In accordance therewith, it should be readily apparent that multiple sets of conditions can be generated and appropriately named, e.g., upon selection of the save button 316. For example, in accordance with the above-mentioned scenarios, "When safe at home" can be a first saved template of conditions 301, while "If not home by 4" can be a second set of conditions 301, while "If leaving before home from work" can be yet another set of conditions 301 that can be saved and selected to apply and/or be activated at any time according to preference, desires, or circumstances.

Likewise, interface 300 can also include a means for selecting a frequency or duration of conditions 301, as exemplified by reference numeral 312. For example, apply the configured conditions 301 on a daily basis, on weekdays, weekends, just once or today only, or for the next two weeks only, e.g., while mom and dad are on holiday, and so on. In addition, various other conditions 301 can be selected or created, which can include conditions 301 that relate to a status or state of target location 110, which is illustrated in connection with reference numeral 314.

For example, other femtocell services as well as third party devices or services can be leveraged to identify or query various status- or state-based parameters in connection with one's home, such as thermostat readings, the state of locking mechanisms for various doors, and so forth. Thus, a given set of conditions 301 can be constructed to facilitate transmission of notification 114 when Ashley arrives at home and when she forgot to lock the door behind her. As another example, a given set of conditions 301 can be constructed to facilitate transmission of notification 114 when Ashley arrives at home and when the babysitter is not present (e.g., babysitter's mobile device has not registered with the femtocell at mom's home). As a third provided example, a given set of conditions 301 can be constructed to facilitate transmission of notification 114 when Ashley departs from home during weather warnings or bad weather forecasts in the area of target location 110 (e.g., obtained from a third party service).

Furthermore, in one or more aspects, notification component 112 can be further configured to export or import all or a portion of set of conditions 301 to or from a record associated with a second subservient mobile device 106. For instance, if mom sets up a first set of conditions 301 that apply to Ashley's mobile device (based upon selection of Ashley in box 302), that record can be imported to apply the same (or quickly updateable) conditions 301 to Billy's mobile device. Such can be provided by way of export 318 or import 320 features that can be included in interface 300. In addition, notification component 112 can be further configured to export or import all or a portion of set of conditions 301 to or from a disparate account or wireless communications service provision. For example, suppose mom sets up a number of sets of conditions 301 relating to both Ashley and Billy, which she uses quite often. However, mom intends to take a vacation for the next two weeks, during which time Ashley and Billy will be staying with aunt Sally.

Mom would like aunt Sally to receive all the same notification 114, yet rather than requiring aunt Sally to repeat all the same condition 301 setup procedures, mom can export the saved template(s), and aunt Sally can import them, such that all relevant conditions 301 and other aspects that previously applied to the old target location 110 (e.g., home), can now apply to the new target location 110 (e.g., aunt Sally's home) and rather than mom being the recipient of any such notifications 114, aunt Sally can receive those notifications 114 instead.

Moreover, in one or more aspects, notification component 112 can be further configured to facilitate download and/or access to all or a portion of stored presence information 104. For example, mom might generally only be interested in receiving notifications 114 based upon input conditions 301. However, the situation might arise in which mom would be interested in knowing additional information relating to Ashley's presence, even when such does not trigger a notification. In such cases, presence history can be accessed by authorized parties (e.g., mom or dad) by way of presence history option 322. In some aspects, however, presence information 104 can be kept only for a short amount of time, or can be deleted immediately after any such data is employed in determining whether or not to provide notification 114, both of which can be utilized to, e.g., to provide an additional layer of privacy. Further still, in addition to what has been described above, interface 300 can also allow for importing a wide range of default or preconfigured sets of conditions 301, e.g., ready-made templates provided by the host wireless communications network. Additionally or alternatively, in some cases, e.g., when selected by an authorized party, various conditions 301 can be intelligently determined or inferred, which is further discussed in connection with FIG. 4.

Figure 4:
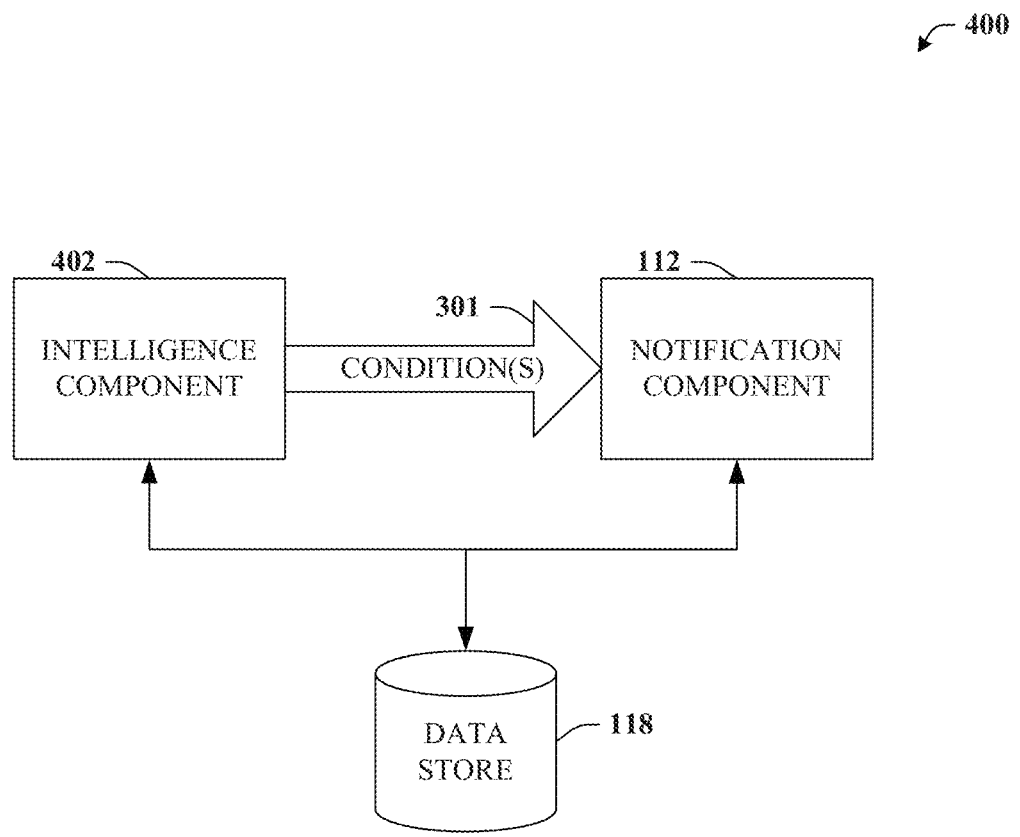
FIG. 4 is a block diagram of a system that can perform or aid with various determinations or inferences.

Now turning to FIG. 4, system 400 that can perform or aid with various determinations or inferences is illustrated. Generally, system 400 can include notification component 112 that can facilitate transmission of notification 114 to one or more custodian device 116 when presence information 104 satisfies set of predetermined conditions 301, as substantially described above. In addition to what has been described, components described herein can make intelligent determinations or inferences. For example, Bayesian probabilities or confidence measures can be employed or inferences can be based upon machine learning techniques related to historical analysis, feedback, and/or previous determinations or inferences.

For instance, notification component 112 can intelligently determine or infer a suitable set of predetermined conditions 301. Such an intelligent determination or inference can be based upon, e.g., presence information 104 that is exceptional or otherwise deviates from a norm. As one example, consider the scenario described above in Ashley's school lets out at 3:30 pm on weekdays, and in which Ashley typically arrives home a few minutes before 4:00 pm, as evidenced by a history of presence information 104 describing registration to the home femtocell. Further suppose that mom wants to be notified in the event Ashley does not arrive home by, say, 4:15 pm, and has configured set of predetermined conditions 301 appropriately. However, consider the case in which on one particular day, Ashley arrives home at 2:00 pm. Such would generally indicate an unusual event, such as school closing, illness, truancy, or the like. Thus, notification component 112 can intelligently infer that mom would likely desire to learn of such presence information 104. Accordingly, notification component 112 can construct suitable predetermined conditions 301 and facilitate transmission of the associated notification 114 to mom immediately. Appreciably, as with all notifications 114, a convenient link or other object can be embedded in notification 114, allowing all such notifications 114 of that type to be cancelled in the future. For instance, notification 114 can include a small hyperlink with the anchor text, e.g., "Do not send notifications of this type." Upon selection, that particular set of predetermined conditions 301 can be deleted or otherwise removed from processing.

In addition, system 400 can also include intelligence component 402 that can provide for or aid in various inferences or determinations. In particular, in accordance with or in addition to what has been described supra with respect to intelligent determinations or inferences provided by various components described herein, e.g., all or portions of notification component 112. Additionally or alternatively, all or portions of intelligence component 402 can be included in one or more components described herein. Thus, intelligence component 402 can reside in whole or in part within system 100 or within components described therein. Moreover, intelligence component 402 will typically have access to all or portions of data sets described herein, such as data store 118.

In more detail, in order to provide for or aid in the numerous inferences described herein, intelligence component 402 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5A:
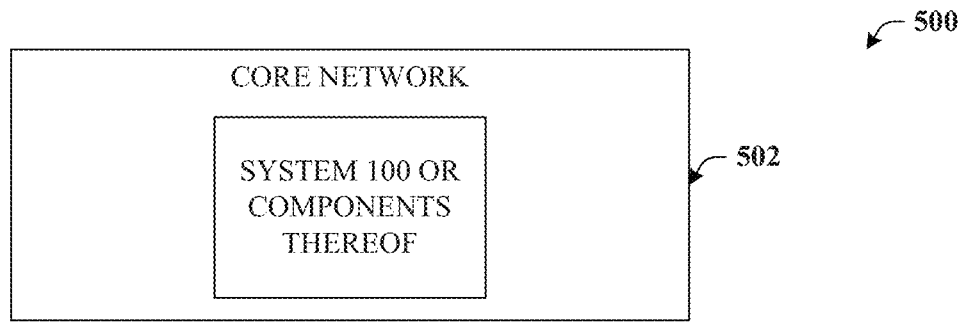
FIG. 5A illustrates a block diagram of a system in which all or a portion of the components described herein can be included in a core network of the wireless communications network.
Figure 5B:
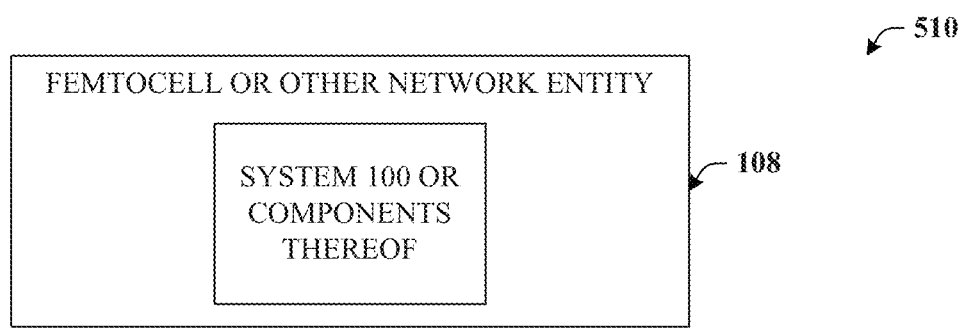
FIG. 5B depicts a block diagram of a system is configured such that all or a portion of the components described herein can be included in a femtocell or other network entity associated with the target location.
Figure 5C:
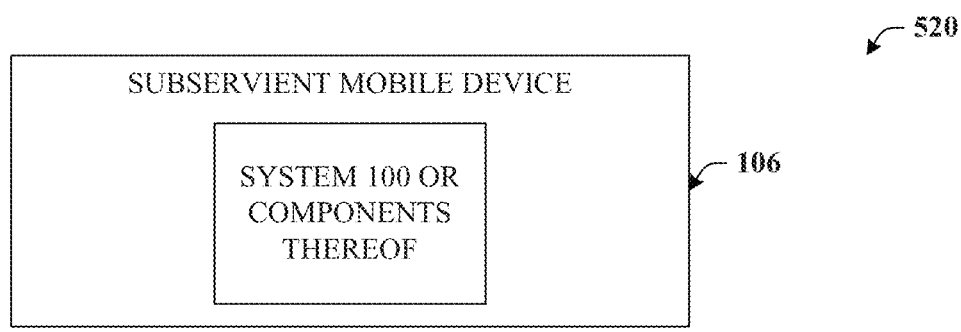
FIG. 5C illustrates a block diagram of a system in which all or a portion of the components described herein can be included in the subservient mobile device.

With reference now to FIGS. 5A-C, various design configurations are depicted. In particular, FIG. 5A illustrates system 500 in which all or a portion of the components described herein can be included in a core network 502 of the wireless communications network. For example, a presence server included in core network 502 can operate as presence component 102, while a suitable notification application executing on the presence server can function as notification component 112.

Referring to FIG. 5B, system 510 is configured such that all or a portion of the components described herein can be included in a femtocell (e.g., femtocell 202) or other network entity 108 associated with target location 110. Likewise, FIG. 5C relates to system 520 in which all or a portion of the components described herein can be included in subservient mobile device 106.

Figure 6:
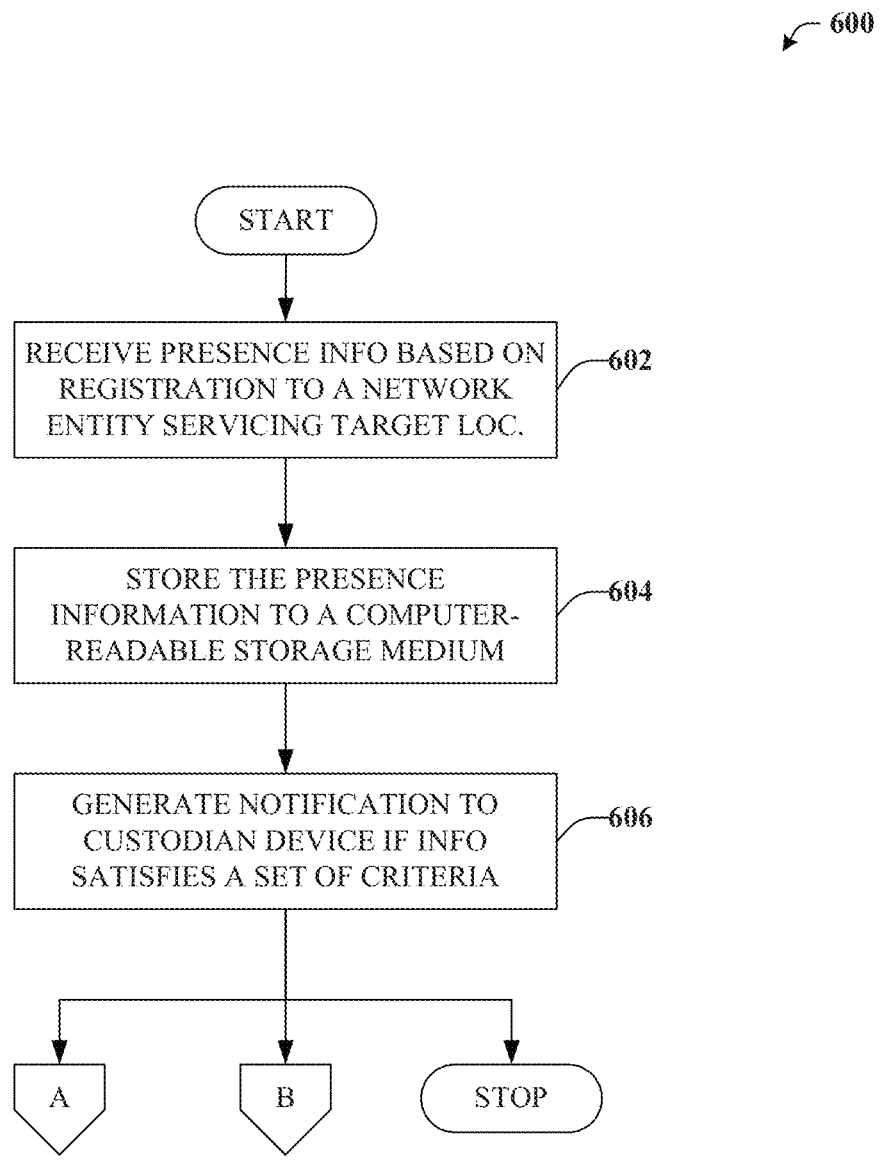
FIG. 6 depicts an exemplary flow chart of procedures defining a method for creating notifications in a wireless communications network based upon device presence information.
Figure 7:
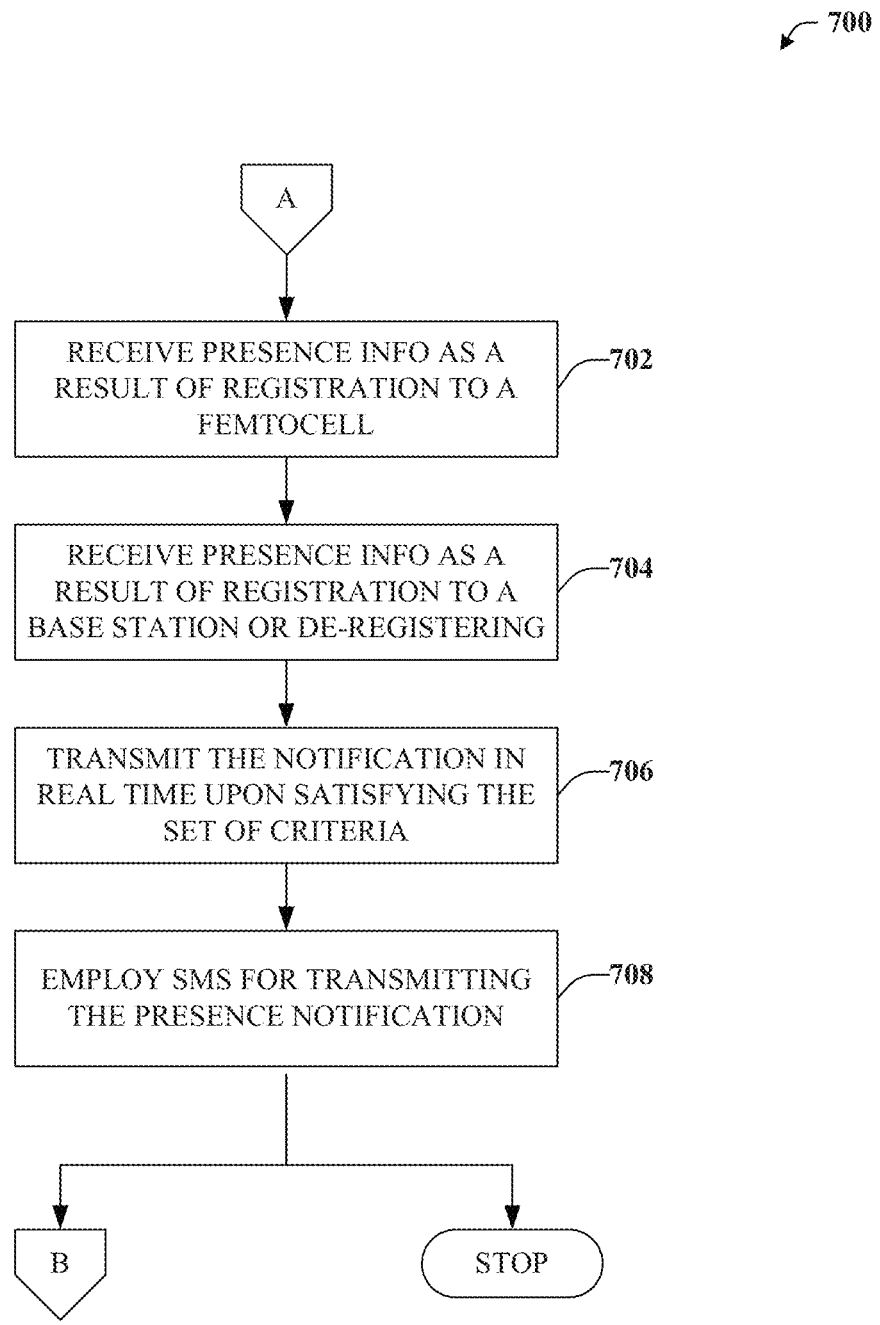
FIG. 7 is an exemplary flow chart of procedures that define a method for providing additional features or aspects in connection with creating notifications in a wireless communications network based upon device presence information.
Figure 8:
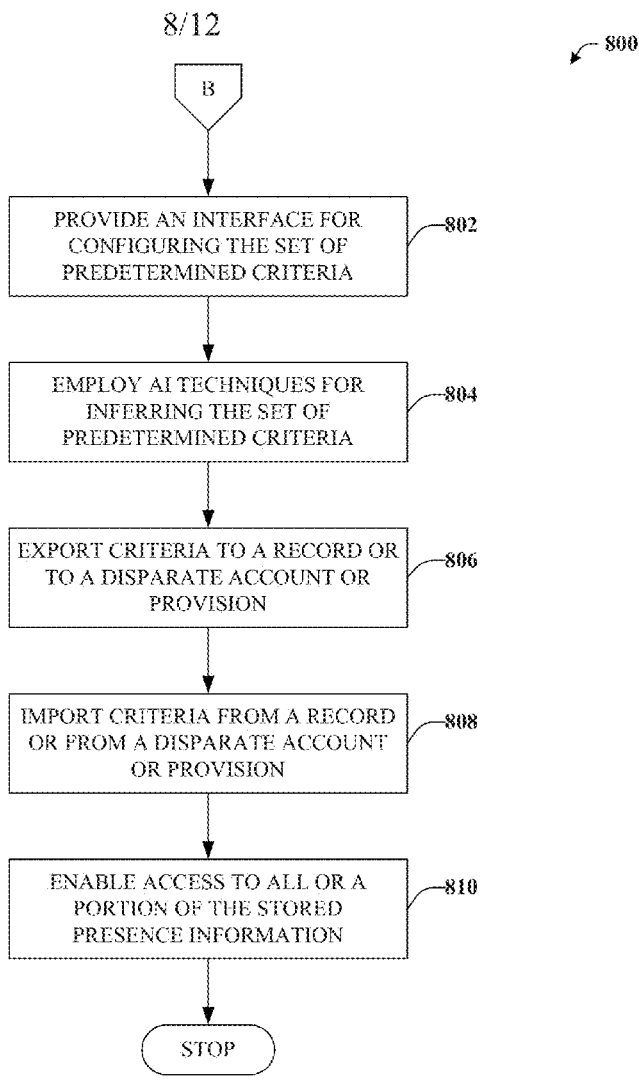
FIG. 8 depicts an exemplary flow chart of procedures defining a method for providing additional features or aspects in connection configuring the set of predetermined criteria.

FIGS. 6-8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 for creating notifications in a wireless communications network based upon device presence information is depicted. Generally, at reference numeral 602, presence information based upon registration to a network entity servicing a target location by a subservient mobile device can be electronically received. For example, when the subservient mobile device registers with the network entity (e.g., in order to connect to the network via the network entity), then such registration can constitute presence information indicative of the fact that the device (and therefore a user thereof) is at or near the target location.

Hence, at reference numeral 604, the presence information can be stored to a computer-readable storage medium such as to a disc or to any suitable type of memory. Appreciably, the storage can be for a short duration (e.g., when custodians do not wish the data to be maintained) or for longer-term storage. Regardless, at reference numeral 606, a presence notification can be generated and propagated to at least one custodian device (e.g., an authorized device configured and/or designated to receive the presence notifications) if the presence information satisfies a set of predetermined criteria.

Turning now to FIG. 7, exemplary method 700 for providing additional features or aspects in connection with creating notifications in a wireless communications network based upon device presence information is illustrated. At reference numeral 702, presence information received at reference numeral 602 of FIG. 6 can be received as a result of the subservient mobile device registering to a femtocell (e.g., the network entity in this case) at the target location.

In contrast, at reference numeral 704, the presence information ca be received as a result of the subservient mobile device registering to a base station servicing the target location (or with another network entity), or as a result of the subservient mobile device de-registering from the femtocell at the target location. Appreciably, in this case, the presence information relates to a lack of presence such as when the subservient device departs from the target location as opposed to arriving at the target location. In either case, the subservient is no longer registered with the femtocell at the target location, so it can be presumed presence no longer exists at the target location.

At reference numeral 706, the presence notification generated in connection with reference numeral 606 can be transmitted to the custodian device in real time upon satisfying the set of predetermined criteria. Appreciably, at reference numeral 708, short message service (SMS) can be employed for transmitting the presence notification.

With reference now FIG. 8, exemplary method 800 for providing additional features or aspects in connection configuring the set of predetermined criteria is depicted. In general, at reference numeral 802, an interface for configuring the set of predetermined criteria can be provided. For example, the interface can include options for setting various desired criteria as well as other related parameters (e.g., to whom to send notifications).

At reference numeral 804, artificial intelligence techniques can be employed for inferring the set of predetermined criteria. For example, based upon patterns or unusual events or the like. Regardless of the manner in which the set of predetermined criteria is created, at reference numeral 806, all or a portion of the set of predetermined criteria can be exported to a record associated with a second subservient device, or to a disparate account or provision associated with the wireless communications network. Accordingly, setting up criteria relating to a first subservient mobile device, satisfaction of which will result in transmission of the presence notification can be readily exported for use with other subservient devices associated with the same account or by other account subscribers.

Additionally or alternatively, at reference numeral 808, all or a portion of the set of predetermined criteria can be imported from a record associated with a second subservient device, or from a disparate account or provision associated with the wireless communications network. In addition, at reference numeral 810, access to all or a portion of stored presence information can be enabled. For example, presence information stored in connection with reference numeral 606 of FIG. 6 can be accessed by authorized parties. Such information can include data relating to all presence information including that which did not satisfy the necessary conditions to be included in the presence notification. In other words, authorized parties might desire to be informed via the presence notification upon certain conditions being satisfied (e.g., the set of predetermined criteria), yet might also desire the ability to browse additional presence information associated with the subservient mobile device(s) as well.

Figure 9:
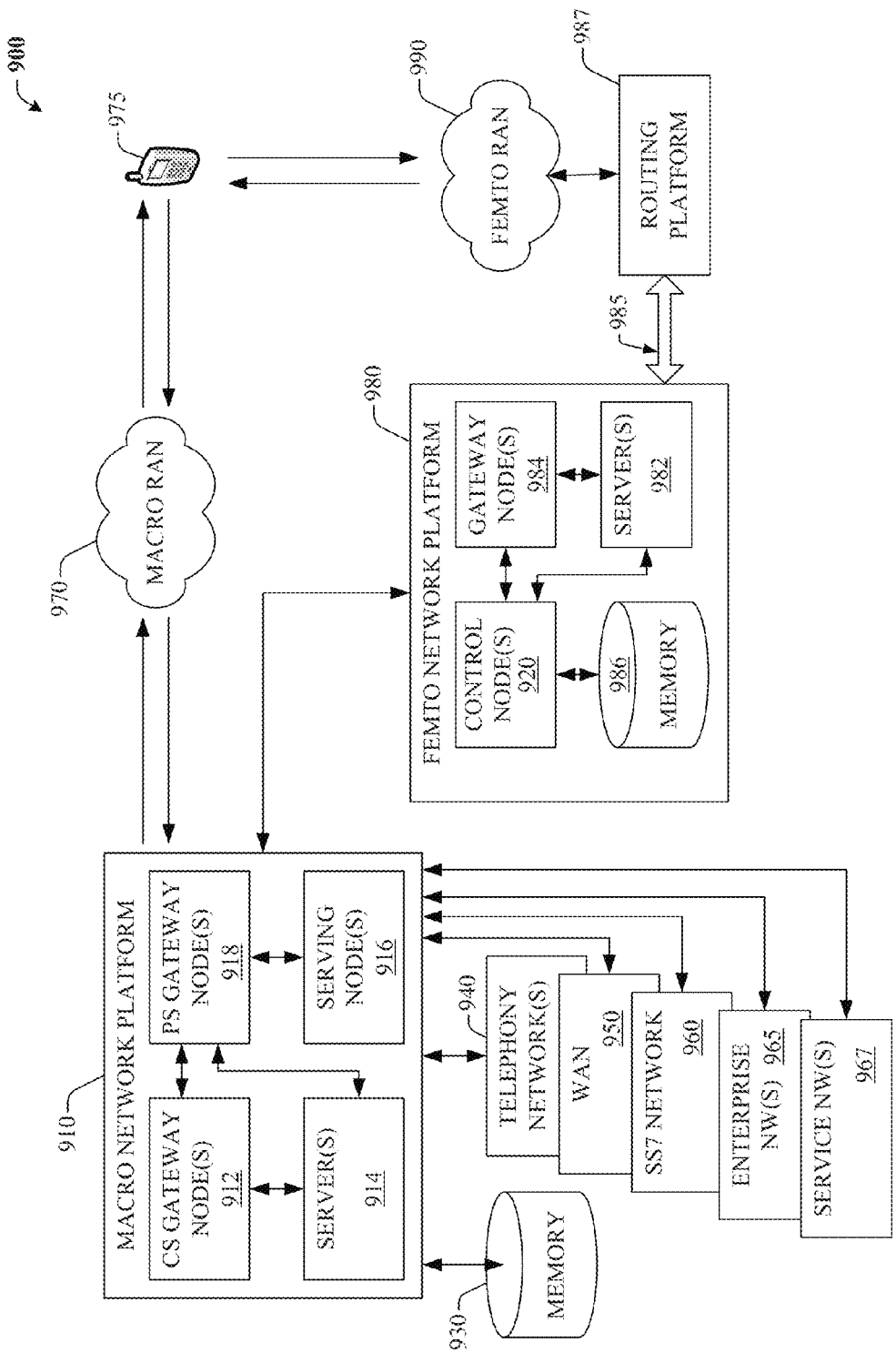
FIG. 9 illustrates an example wireless communication environment with associated components that can enable operation of an enterprise network in accordance with aspects described herein.

To provide further context for various aspects of the subject specification, FIG. 9 illustrates an example wireless communication environment 900, with associated components that can enable operation of a femtocell enterprise network in accordance with aspects described herein. Wireless communication environment 900 includes two wireless network platforms: (i) A macro network platform 910 that serves, or facilitates communication) with user equipment 975 via a macro radio access network (RAN) 970. It should be appreciated that in cellular wireless technologies (e.g., 4G, 3GPP UMTS, HSPA, 3GPP LTE, 3GPP UMB), macro network platform 910 is embodied in a Core Network. (ii) A femto network platform 980, which can provide communication with UE 975 through a femto RAN 990, linked to the femto network platform 980 through a routing platform 92 via backhaul pipe(s) 985, wherein backhaul pipe(s) are substantially the same a backhaul link 3853 below. It should be appreciated that femto network platform 980 typically offloads UE 975 from macro network, once UE 975 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 970 can comprise various coverage cells like cell 1205, while femto RAN 990 can comprise multiple femto access points. As mentioned above, it is to be appreciated that deployment density in femto RAN 990 is substantially higher than in macro RAN 970.

Generally, both macro and femto network platforms 910 and 980 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 910 includes CS gateway node(s) 912 which can interface CS traffic received from legacy networks like telephony network(s) 940 (e.g., public switched telephone network (PSTN), or public land mobile network (PLMN)) or a SS7 network 960. Circuit switched gateway 912 can authorize and authenticate traffic (e.g., voice) arising from such networks. Additionally, CS gateway 912 can access mobility, or roaming, data generated through SS7 network 960; for instance, mobility data stored in a VLR, which can reside in memory 930. Moreover, CS gateway node(s) 912 interfaces CS-based traffic and signaling and gateway node(s) 918. As an example, in a 3GPP UMTS network, gateway node(s) 918 can be embodied in gateway GPRS support node(s) (GGSN).

In addition to receiving and processing CS-switched traffic and signaling, gateway node(s) 918 can authorize and authenticate PS-based data sessions with served (e.g., through macro RAN) wireless devices. Data sessions can include traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. To that end, in an aspect, gateway node(s) 918 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 914. It is to be noted that in 3GPP UMTS network(s), gateway node(s) 918 (e.g., GGSN) and tunnel interface (e.g., TTG) comprise a packet data gateway (PDG).

Macro network platform 910 also includes serving node(s) 916 that convey the various packetized flows of information or data streams, received through gateway node(s) 918. As an example, in a 3GPP UMTS network, serving node(s) can be embodied in serving GPRS support node(s) (SGSN).

As indicated above, server(s) 914 in macro network platform 910 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 910. Data streams can be conveyed to gateway node(s) 918 for authorization/authentication and initiation of a data session, and to serving node(s) 916 for communication thereafter. Server(s) 914 can also effect security (e.g., implement one or more firewalls) of macro network platform 910 to ensure network's operation and data integrity in addition to authorization and authentication procedures that CS gateway node(s) 912 and gateway node(s) 918 can enact. Moreover, server(s) 914 can provision services from external network(s), e.g., WAN 950, or Global Positioning System (GPS) network(s) (not shown). It is to be noted that server(s) 914 can include one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can include business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960, enterprise NW(s) 965, or service NW(s) 967.

Femto gateway node(s) 984 have substantially the same functionality as PS gateway node(s) 918. Additionally, femto gateway node(s) 984 can also include substantially all functionality of serving node(s) 916. In an aspect, femto gateway node(s) 984 facilitates handover resolution, e.g., assessment and execution. Further, control node(s) 920 can receive handover requests and relay them to a handover component (not shown) via gateway node(s) 984. According to an aspect, control node(s) 920 can support RNC capabilities.

Server(s) 982 have substantially the same functionality as described in connection with server(s) 914. In an aspect, server(s) 982 can execute multiple application(s) that provide service (e.g., voice and data) to wireless devices served through femto RAN 990. Server(s) 982 can also provide security features to femto network platform. In addition, server(s) 982 can manage (e.g., schedule, queue, format . . . ) substantially all packetized flows (e.g., IP-based, frame relay-based, ATM-based) it generates in addition to data received from macro network platform 910. It is to be noted that server(s) 982 can include one or more processor configured to confer at least in part the functionality of macro network platform 910. To that end, the one or more processor can execute code instructions stored in memory 986, for example.

Memory 986 can include information relevant to operation of the various components of femto network platform 980. For example operational information that can be stored in memory 986 can comprise, but is not limited to, subscriber information; contracted services; maintenance and service records; femto cell configuration (e.g., devices served through femto RAN 990; access control lists, or white lists); service policies and specifications; privacy policies; add-on features; and so forth.

It is noted that femto network platform 980 and macro network platform 910 can be functionally connected through one or more reference link(s) or reference interface(s). In addition, femto network platform 980 can be functionally coupled directly (not illustrated) to one or more of external network(s) 940, 950, 960, 965 or 967. Reference link(s) or interface(s) can functionally link at least one of gateway node(s) 984 or server(s) 986 to the one or more external networks 940, 950, 960, 965 or 967.

Figure 10:
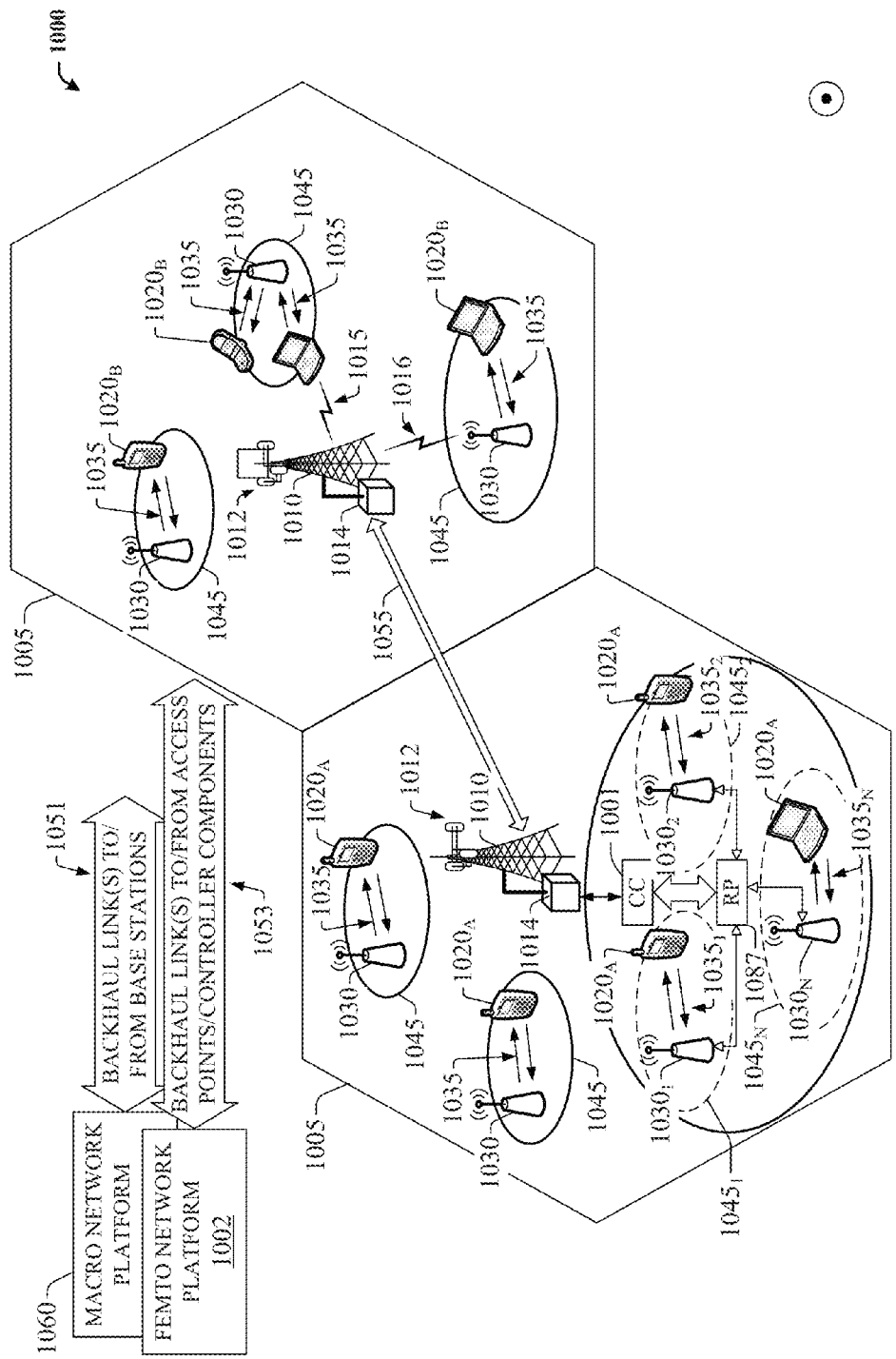
FIG. 10 illustrates a schematic deployment of a macro cell for wireless coverage in accordance with aspects of the subject specification.

FIG. 10 illustrates a wireless environment that includes macro cells and femtocells for wireless coverage in accordance with aspects described herein. In wireless environment 1050, two areas 1005 represent "macro" cell coverage; each macro cell is served by a base station 1010. It can be appreciated that macro cell coverage area 1005 and base station 1010 can include functionality, as more fully described herein, for example, with regard to system 1000. Macro coverage is generally intended to serve mobile wireless devices, like UE $1020_A$, $1020_B$, in outdoors locations. An over-the-air wireless link 105 provides such coverage, the wireless link 1215 comprises a downlink (DL) and an uplink (UL), and utilizes a predetermined band, licensed or unlicensed, of the radio frequency (RF) spectrum. As an example, UE $1020_A$, $1020_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1010 communicates via backhaul link(s) 1051 with a macro network platform 1060, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1060 controls a set of base stations 1010 that serve either respective cells or a number of sectors within such cells. Base station 1010 comprises radio equipment 1014 for operation in one or more radio technologies, and a set of antennas 1012 (e.g., smart antennas, microwave antennas, satellite dish(es) . . . ) that can serve one or more sectors within a macro cell 1005. It is noted that a set of radio network control node(s), which can be a part of macro network platform; a set of base stations (e.g., Node B 1010) that serve a set of macro cells 1005; electronics, circuitry or components associated with the base stations in the set of base stations; a set of respective OTA wireless links (e.g., links 1015 or 1016) operated in accordance to a radio technology through the base stations; and backhaul link(s) 1055 and 1051 form a macro radio access network (RAN). Macro network platform 1060 also communicates with other base stations (not shown) that serve other cells (not shown). Backhaul link(s) 1051 or 1053 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1055 link disparate base stations 1010. According to an aspect, backhaul link 1053 can connect multiple femto access points 1030 and/or controller components (CC) 1001 to the femto network platform 1002. In one example, multiple femto APs can be connected to a routing platform (RP) 1087, which in turn can be connect to a controller component (CC) 1001. Typically, the information from UEs $1020_A$ can be routed by the RP 102, for example, internally, to another UE $1020_A$ connected to a disparate femto AP connected to the RP 1087, or, externally, to the femto network platform 1002 via the CC 1001, as discussed in detail supra.

In wireless environment 1050, within one or more macro cell(s) 1005, a set of femtocells 1045 served by respective femto access points (APs) 1030 can be deployed. It can be appreciated that, aspects of the subject innovation are geared to femtocell deployments with substantive femto AP density, e.g., $10^4$-$10^7$ femto APs 1030 per base station 1010. According to an aspect, a set of femto access points $1030_1$-$1030_N$, with N a natural number, can be functionally connected to a routing platform 1087, which can be functionally coupled to a controller component 1001. The controller component 1001 can be operationally linked to the femto network platform 330 by employing backhaul link(s) 1053. Accordingly, UE $1020_A$ connected to femto APs $1030_1$-$1030_N$ can communicate internally within the femto enterprise via the routing platform (RP) 1087 and/or can also communicate with the femto network platform 1002 via the RP 1087, controller component 1001 and the backhaul link(s) 1053. It can be appreciated that although only one femto enterprise is depicted in FIG. 10, multiple femto enterprise networks can be deployed within a macro cell 1005.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 11:
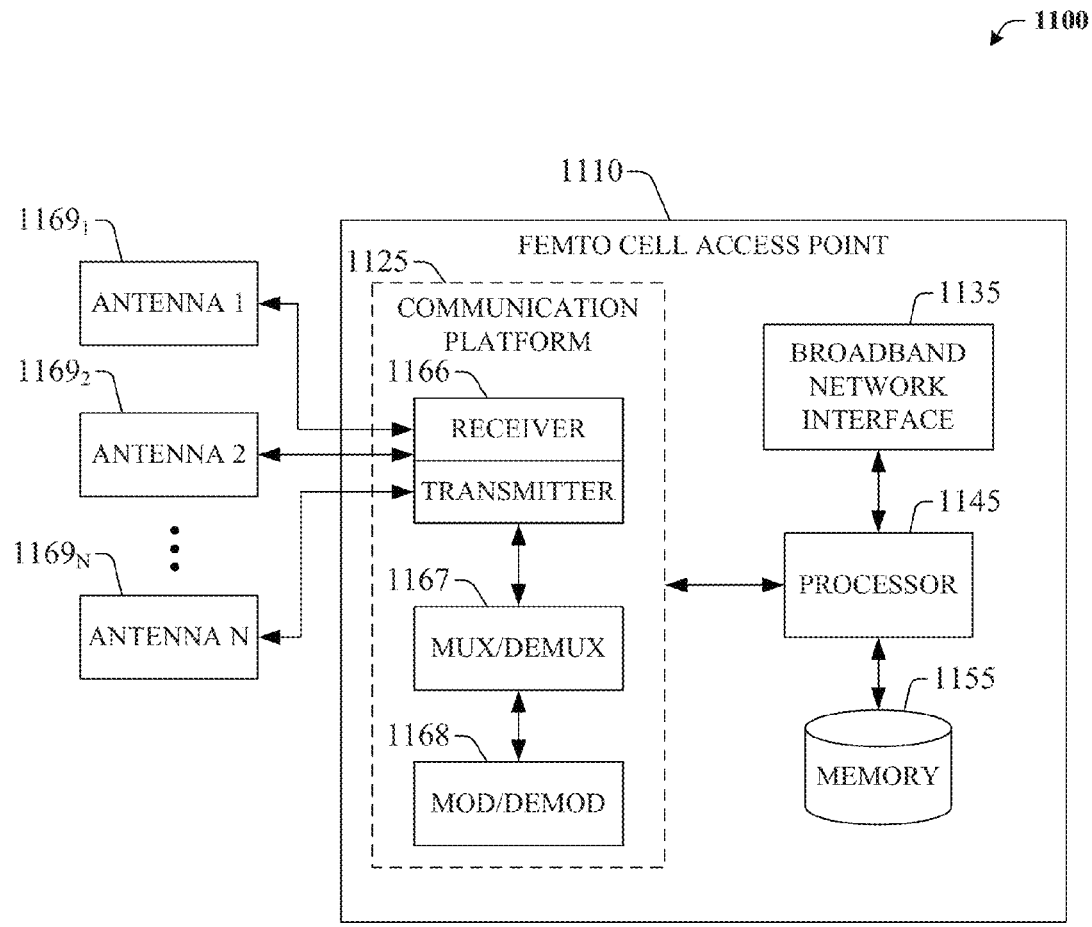
FIG. 11 illustrates a block diagram of an example embodiment of a femtocell access point.

With respect to FIG. 11, in example embodiment 1100, femtocell AP 1110 can receive and transmit signal(s) (e.g., traffic and control signals) from and to wireless devices, access terminals, wireless ports and routers, etc., through a set of antennas $1169_1$-$1169_N$. It should be appreciated that while antennas $1169_1$-$1169_N$ are a part of communication platform 1125, which comprises electronic components and associated circuitry that provides for processing and manipulating of received signal(s) (e.g., a packet flow) and signal(s) (e.g., a broadcast control channel) to be transmitted. In an aspect, communication platform 1125 includes a transmitter/receiver (e.g., a transceiver) 1166 that can convert signal(s) from analog format to digital format upon reception, and from digital format to analog format upon transmission. In addition, receiver/transmitter 1166 can divide a single data stream into multiple, parallel data streams, or perform the reciprocal operation. Coupled to transceiver 1166 is a multiplexer/demultiplexer 1167 that facilitates manipulation of signal in time and frequency space. Electronic component 1167 can multiplex information (data/traffic and control/signaling) according to various multiplexing schemes such as time division multiplexing (TDM), frequency division multiplexing (EDM), orthogonal frequency division multiplexing (OFDM), code division multiplexing (CDM), space division multiplexing (SDM). In addition, mux/demux component 1167 can scramble and spread information (e.g., codes) according to substantially any code known in the art; e.g., Hadamard-Walsh codes, Baker codes, Kasami codes, polyphase codes, and so on. A modulator/demodulator 1168 is also a part of operational group 1125, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1110 also includes a processor 1145 configured to confer functionality, at least partially, to substantially any electronic component in the femto access point 1110, in accordance with aspects of the subject innovation. In particular, processor 1145 can facilitate FAP 1110 to implement configuration instructions received through communication platform 1125, which can include storing data in memory 1155. In addition, processor 1145 facilitates FAP 1110 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1145 can manipulate antennas $1169_1$-$1169_N$ to facilitate beamforming or selective radiation pattern formation, which can benefit specific locations (e.g., basement, home office . . . ) covered by FAP; and exploit substantially any other advantages associated with smart-antenna technology. Memory 1155 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1155 can store configuration information such as schedules and policies; FAP address(es) or geographical indicator(s); access lists (e.g., white lists); license(s) for utilization of add-features for FAP 1110, and so forth.

In embodiment 1100, processor 1145 is coupled to the memory 1155 in order to store and retrieve information necessary to operate and/or confer functionality to communication platform 1125, broadband network interface 1135 (e.g., a broadband modem), and other operational components (e.g., multimode chipset(s), power supply sources . . . ; not shown) that support femto access point 1110. In addition, it is to be noted that the various aspects disclosed in the subject specification can also be implemented through (i) program modules stored in a computer-readable storage medium or memory (e.g., memory 1086 or memory 1155) and executed by a processor (e.g., processor 1145), or (ii) other combination(s) of hardware and software, or hardware and firmware.

Figure 12:
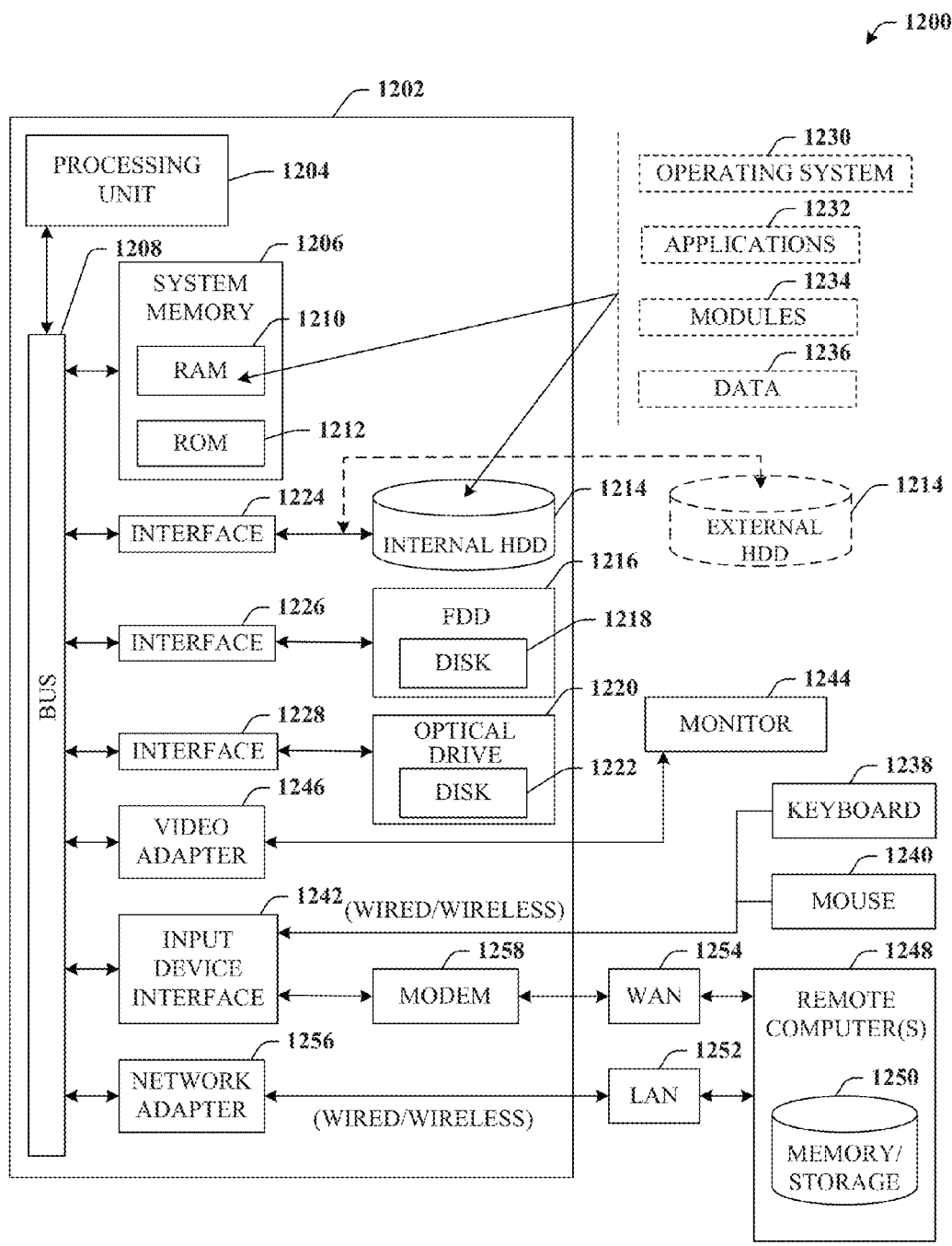
FIG. 12 illustrates a block diagram of a computer operable to execute a portion of the disclosed architecture.

Referring now to FIG. 12, there is illustrated a block diagram of an exemplary computer system operable to execute the disclosed architecture. In order to provide additional context for various aspects of the disclosed subject matter, FIG. 12 and the following discussion are intended to provide a brief, general description of a suitable computing environment 1200 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the disclosed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the disclosed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 12 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A femtocell device, comprising:
a memory to store executable instructions; and
a processor, coupled to the memory, that facilitates execution of the executable instructions to perform operations, comprising:
receiving status data representing a defined state of a premises, wherein the femtocell device provides a communication service and serves a defined coverage area comprising at least a portion of the premises;
facilitating a registration procedure for a first mobile device at the defined area, wherein the registration procedure relates to the first mobile device registering to use the communication service provided by the femtocell device;
in response to the registration procedure being determined to have completed, updating presence data representing an indication of presence of the first mobile device; and
transmitting a notification to a second mobile device that differs from the first mobile device in response to the presence data being determined to satisfy a first condition and the status data being determined to satisfy a second condition, wherein the notification comprises a description of the presence data and the status data.

2. The femtocell device of claim 1, wherein the registration procedure relates to the first mobile device requesting use of the communication service.

3. The femtocell device of claim 1, wherein the registration procedure relates to termination of the communication service for the first mobile device.

4. The femtocell device of claim 1, wherein the defined state of the premises relates to a state of a locking mechanism at the premises.

5. The femtocell device of claim 1, wherein the status data is received from a device that monitors the premises.

6. The femtocell device of claim 1, wherein the operations further comprise configuring the first condition based on input received from a user interface device.

7. The femtocell device of claim 1, wherein the operations further comprise configuring the second condition based on input received from a user interface device.

8. The system of claim 1, wherein the operations further comprise exporting the first condition to a third mobile device that differs from the first mobile device and the second mobile device.

9. A method, comprising:
receiving, by a system comprising a processor, registration data related to a registration protocol between a first mobile device and a femtocell device that services a defined area that comprises at least a portion of a premises;
updating, by the system, presence information representing an indication of presence of the first mobile device based on the registration data;
receiving, by the system, status information relating to a status of the premises; and initiating, by the system, a transmission of a notification to a second mobile device, differing from the first mobile device and the femtocell device, in response to the presence information being determined to satisfy a first condition and the status information being determined to satisfy a second condition different than the first condition, wherein the notification comprises a description of the presence data and the status data.

10. The method of claim 9, wherein the receiving the registration data further comprises receiving the registration data in response to the first mobile device being determined to have connected to a communication network via the femtocell device.

11. The method of claim 9, wherein the receiving the registration data further comprises receiving the registration data in response to a termination of a connection between the first mobile device and the femtocell device.

12. The method of claim 9, wherein the receiving the registration data further comprises receiving the registration data in response to the first mobile device connecting to a communication network via another access point device different than the femtocell device.

13. The method of claim 9, further comprising configuring, by the system, the first condition based on input received from a user interface device.

14. The method of claim 9, further comprising configuring, by the system, the second condition based on input received from a user interface device.

15. A network device, comprising:
 a processor; and
 a memory that stores executable instructions that, when executed by the processor, facilitate performance of operations, comprising:
  receiving, from femtocell device that services a defined area, registration data related to a registration between a first mobile device and the femtocell device;
  modifying presence information for the mobile device based on the registration data;
  receiving, from a monitoring device, status information relating to a status of a premises comprising at least a portion of the defined area serviced by the femtocell device; and
  transmitting a notification to a second mobile device that differs from the first mobile device in response to the presence information being determined to satisfy a first condition and the status information being determined to satisfy a second condition different than the first condition, wherein the notification comprises a description of the presence data and the status data.

16. The network device of claim 15, wherein the registration data relates to the first mobile device connecting to a wireless communication network comprising the network device via the femtocell device.

17. The network device of claim 15, wherein the registration data relates to the first mobile device connecting to a wireless communication network via another femtocell device different than the femtocell device.

18. The network device of claim 15, wherein the registration data relates to the first mobile device disconnecting from the femtocell device.

19. The network device of claim 15, wherein the operations further comprises configuring the first condition or the second condition.

20. The network device of claim 15, wherein the operations further comprises importing or exporting data representing the first condition or the second condition.

* * * * *